UNITED STATES PATENT OFFICE 2,562,000

POLYARYLENE-SILOXANES AND PROCESSES FOR MAKING SAME

Michael Sveda, Cleveland, Ohio, assignor to E. I. du Pont de Nemours & Company, Wilmington, Del., a corporation of Delaware No Drawing. Application October 28, 1946, Serial No. 706,096

10 Claims. (Cl. 260—46.5)

This invention relates to novel polymeric organosilicon compounds and processes for producing them, and is more particularly directed to synthetic linear condensation polymers containing siloxane groups, such polymers being capable of being drawn into pliable, strong fibres showing by characteristic X-ray patterns orientation along the fibre axis, to processes for producing such polymers by condensation reactions, to processes for orienting such polymers in which the molten polymer is formed into a fibre while cooling it to a solid and the fibre is drawn under strain, and to the oriented polymeric compound so produced.

Polymerizable organosilicon compounds are known to have a pronounced cyclizing tendency, that is, a tendency to form ring rather than chain polymers. This characteristic is so strong that rings containing nine —SiO— units (18-membered rings) are easily formed. To this property can probably be attributed the fact that efforts to synthesize linear, high molecular weight, silicon-containing polymers from simple disubstituted silane monomers, such as $R_2SiCl_2$, $$R_2Si(OR)_2$$

and $R_2Si(OH)_2$, have hitherto been unsuccessful. In fact, no method has hitherto been proposed for synthesizing a linear, siloxane-containing, condensation polymer capable of being oriented or cold drawn.

It is an object of this invention to provide novel organosilicon polymers containing siloxane groups. Another object is to provide such polymers which are linear rather than cyclic. Another object is to provide polymers containing alternate oxygen and divalent organic groups between successive silicon atoms. Another object is to provide processes for producing such polymers. Another object is to provide such polymers which are oriented. Another object is to provide processes for producing such oriented polymers. Further objects will appear hereinafter.

Now according to the present invention it has been found that synthetic linear condensation polymers containing siloxane groups and capable of orientation can be produced by condensation reaction of compounds containing two functional-group-bearing silicon atoms which are far enough apart in the molecule that cyclization through the silicons does not occur. It has further been found that by melting such polymers and forming them while cooling to the solid state, fibres can be produced which, after drawing under strain, are oriented along the fibre axis. In a preferred embodiment of the invention the compounds containing the two functional-group-bearing silicons have the formula

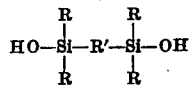

where R stands for a monovalent organic radical and R' for a divalent organic radical, and the condensation reaction is effected by heating such a compound in the presence of a condensation catalyst. The polymers thus produced according to a preferred embodiment have the formula

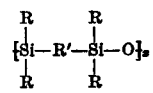

where R and R' have the meaning above stated and $x$ is an integer greater than 1, the products being describable as polymers containing alternate oxygen atoms and divalent organic radicals between consecutive silicon atoms in the polymer chain.

In describing this invention the term condensation is used to name any reaction that occurs with the formation of new bonds between atoms not already joined and proceeds with the elimination of elements such as hydrogen and nitrogen or of simple molecules such as water, alcohols and hydrogen chloride. This meaning of the term is commonly understood and is aptly described in Carothers Patent 2,071,250 at page 1, column 2, line 32. Condensation polymers accordingly are compounds formed by the mutual condensation of a number of functionally similar molecules to form a single molecule.

The term linear as herein applied to polymers is also used in the accepted meaning which is described by Carothers. Linear polymers therefore are compounds whose molecules are long chains built up from repeating units. This type of structure may be symbolized by the general formula . . . A—A—A—A—A—A—A—A—A . . . The unit or radical —A— is called the structural unit of the polymer. Depending upon the nature of the starting materials the units of a given chain may be alike or different. Linear condensation polymers, of course, are linear polymers formed by condensation reaction.

The term siloxane group is used to refer to the bivalent radical, —SiOSi—. It will be understood that the siloxane group is present as a structural unit of the polymer chain.

The linear condensation polymers of this invention are capable of orientation, that is, they may be drawn under strain so as to produce a parallel alignment of the polymer molecules. This phenomenon is fully described in "The Collected Papers of Wallace H. Carothers on Polymerization" by Mark and Whitby, 1940, starting at page 180 with reference to organic polymers which are "cold drawn," that is, drawn under strain. The presence of orientation in the fibre is indicated by characteristic X-ray patterns which show that the orientation is along the fibre axis. Orientation of the fibres is further evidenced by the fact that they exhibit birefringence with parallel extinction between crossed Nicol's prisms.

The term "functional-group-bearing silicon" as used in describing this invention will be understood to mean a group in which there is a silicon atom attached to a functional group in such an arrangement as might lead to a reaction step yielding a siloxane linkage. More particularly, the functional group may be a hydroxyl group, —OH. In the monomeric molecule from which the polymers of this invention are produced there should be two such silicon groups and they should be far enough apart in the molecule that cyclization through them does not occur. It has been found, for instance, that if the silicol groups are separated from each other by being attached in the para positions of a benzene ring the distance between them is great enough to prevent the formation of ring compounds containing the siloxane groups in the ring and the formation of linear polymers capable of orientation becomes possible.

In a preferred embodiment of this invention the separation of the two functional-group-bearing silicons in the monomer from which the polymer is made is accomplished by attaching them to opposite ends of divalent organic radicals. Such compositions and their method of preparation are the subject of my copending patent application Serial No. 706,095, filed October 28, 1946. Preferred polymers of the present invention in which the valences of silicon not attached to the bivalent organic group or to oxygen are attached to monovalent organic groups may be represented by the formula

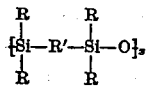

where R stands for a monovalent organic radical, R' for a divalent organic radical, and $x$ for an integer larger than 1. By "monovalent organic radical" is meant a group which contains organic carbon and has a single point of attachment to the molecule. The radical may, for instance, be aliphatic or alkyl, such as a methyl, ethyl, or longer hydrocarbon group; it may be aryl, such as phenyl, diphenyl, or tolyl; it may be unsaturated, such as allyl; it may by cycloaliphatic, such as cyclohexyl; it may be a substituted hydrocarbon group, such as cyanomethyl or halo-methyl such as trifluromethyl or $C_nF_{(2n+1)}$; it may be aralkyl, such as a benzyl group.

R' in the formula stands for a divalent organic radical, that is, a group which contains organic carbon and has two points of attachment to the rest of the molecule. The radical may, for instance, be a methylene-containing radical, such as hexamethylene or other polymethylenes; it may be arylene, such as phenylene, biphenylene or diphenylene ether; it may be aralkylene, such as the —$CH_2C_6H_4CH_2$— group; or it may be cycloalkylene, such as the 1,4-$C_6H_{10}$— group.

It will be observed that in the above formula R' is the structure separating the siloxane groups of the product and hence must be of sufficient length that cyclization through their silicons does not occur during formation of the polymer. This has been found to be the case when the structure of R' is such that in the shortest chain joining the two silicon atoms there are at least four carbon atoms. Thus, if R' stands for a polymethylene group it is preferred that it be at least as long as a tetramethylene group, —$(CH_2)_4$—, while if R' stands for a phenyl group it is preferred that the silicons be attached in the para positions, since ortho attachment would give only two and meta only three carbon atoms in the shortest chain between the silicons, the six-membered para-substituted phenyl ring being regarded as furnishing two chains of four carbon atoms each joining the silicons.

In a preferred process of this invention a monomeric compound having the formula

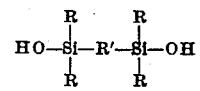

is polymerized by heating in the presence of a catalyst. In the formula for the monomer R and R' have the same significance as set forth above for the polymer, that is, they are monovalent and divalent organic radicals, respectively. Such monomers may be obtained by coupling to an organic dihalide of the halide-R'-halide type at each of the halide positions a dihalosilane disubstituted with monovalent organic radicals by removing halide radicals from the silane and from the organic dihalide and effecting chemical combination at the points of halide removal, and hydrolyzing the resultant product, as described in my abovementioned copending patent application.

It is important that the monomer to be polymerized be substantially pure. It may be purified if necessary by fractional recrystallization. For instance, it may be dissolved in diethyl ether, the ether evaporated off until recrystallization starts, and the recrystallization then accelerated by adding benzene, since the impurities usually present are soluble in benzene but the desired monomer is insoluble.

To polymerize the purified monomer a catalyst is added and the mixture is heated. As the catalyst one may use a condensation catalyst such as a strong base or a material which under the conditions present during the polymerization will dissociate to liberate a strong base. Thus, bases such as hydroxides, oxides, and carbonates of metals such as sodium, lithium, and potassium may be used, or easily hydrolyzed salts of these metals with acids such as acetic or hydrofluoric may be employed. Particularly preferred as catalysts are the alkali metal hydroxides, namely, sodium hydroxide, potassium hydroxide, and lithium hydroxide. Among salts which may be used are sodium cyanide, sodium fluoride, and sodium nitrite.

The amount of catalyst used depends on the catalyst, the monomer being polymerized, the molecular weight of polymer desired, and other, similar considerations. In general, the amount will not exceed about one per cent by weight, based on the weight of monomer. When the monomer is a diol in which R' is an arylene group and R is a short chain alkyl group, and the catalyst used is an alkali metal hydroxide it has been found that the amount of catalyst may be only a fraction of one per cent. With sodium hydroxide, for instance, products capable of orientation have been made at catalyst concentrations of from 0.01 to 0.04 per cent. With lithium hydroxide the amounts used approximate those of sodium hydroxide on an equivalent molal basis, while with potassium hydroxide as little as 0.005 per cent by weight is sufficient to give orientable polymers. It appears that excess amounts of alkali metal hydroxides act as a chain-stopper, that is, they catalyze the polymerization but tend to give products of lower molecular weight.

The polymerization of the monomer is effected by heating it with the catalyst to a temperature above that required to melt the polymer to be produced. The temperature may be raised gradually, and any danger of oxidation may be avoided by conducting the heating in an inert atmosphere such as nitrogen. When the desired temperature is reached it is maintained long enough to permit equilibrium to be reached at the desired molecular weight. Ordinarily it is preferred to attain a temperature above about 180° C. and to maintain this temperature for about from 10 to 80 hours. When the divalent organic radical of the monomer is an arylene group and the monovalent organic radical is a short chain alkyl group such as methyl or ethyl, a heating time of about 48 hours above 200° C. with about 40 hours of this at 250° C. has been found to give excellent results.

After the heating in the presence of a catalyst the monomer is found to have undergone condensation with the production of a linear polymer, and such polymer is found to be orientable. It will be understood that when in this description reference is made to a linear polymer the possibility of cross-linking between the linear chains is not excluded, but that such cross-linking is of a minor order of magnitude, so that the fundamental polymeric structure is linear rather than cyclic in character.

The molten linear polymer may be cast and cooled in a mold so as to produce shaped articles. It may also be cast upon a smooth chilled surface to form films of great utility.

The molten polymer may be formed into fibres as an integral part of the process of manufacture, as for instance by extruding it through a die while chilling to a solid, or the solid polymer may be dissolved in a suitable solvent and fibres may be formed by extruding the solution into a coagulating bath. The fibres so produced may according to this invention then be drawn under strain whereby an oriented structure is produced in the polymer. By drawing under strain is meant that the fibre is elongated past its limit of elasticity so that cold flow occurs under conditions such that work is performed.

The orientation produced by this drawing under strain is easily observable in the Laue lines exhibited by X-ray diffraction pictures of the drawn fibre. The drawn fibre has substantially greater tensile strength than the fibre before drawing, and its other physical and chemical properties are characteristically those of an oriented structure. It is believed that the orientation has the effect of aligning the linear polymer chains in parallel relation.

The invention will be better understood by reference to the following illustrative examples.

Example I

The apparatus used in this preparation consisted of a vessel fitted with a thermometer, agitator, and an extraction device carrying a reflux condenser at the top and a stopcock between the extractor and the vessel. A connecting tube between the vessel and the vapor inlet at the top of the condenser permitted solvents to be circulated through vaporization and condensation.

In carrying out one embodiment of this invention 400 parts by weight (1.69 moles) of solid p-phenylene bromide was placed in the extraction device. The vessel, below, was charged with 656 parts (5.09 moles=50% excess) of dimethyldichlorosilane, 124 parts (5.09 atoms=50% excess) of metallic magnesium (Grignard grade), and 496 parts of anhydrous ethyl ether. To initiate the reaction, a trace of elemental iodine and 8 parts of methyl iodide were added to the reaction mixture contained in the vessel. The vessel was then gently warmed so that ether vapor was distilled over into the top of the condenser, the condensate running down into the extraction device containing the p-phenylene bromide. The latter dissolved in the ether, and as the ethereal solution entered the main reaction vessel, interaction between the p-phenylene bromide, dimethyldichlorosilane, and metallic magnesium occurred. Heat was generated and the reaction became self-sustaining. Ether was continuously distilled over into the extraction thimble, and re-entered the reaction vessel, carrying additional quantities of p-phenylene bromide in solution. Occasionally, it was necessary to cool the reaction vessel to moderate the reaction, so that the rate of dissolving p-phenylene bromide was such that all of it had been added over a period of five hours. Following this, the reaction mixture was refluxed for an additional four hours.

As the reaction proceeded, a mixture of magnesium bromide and chloride precipitated. After the reaction had been completed, the magnesium halides were separated by filtration under anhydrous conditions, to prevent hydrolysis of the main reaction product. The precipitate was washed with 1200 parts of anhydrous benzene.

To isolate the reaction product, the ethyl ether and benzene were removed by distillation at atmospheric pressure. During this distillation, additional quantities of magnesium halides precipitated and were removed periodically.

Following removal of solvents, the residue was purified by vacuum distillation whereupon a quantity of p-phenylene-bis-(dimethylchlorosilane) was obtained as a solid melting at 87° C. and boiling at 110° C. under 1.5 mm.

The p-phenylene-bis-(dimethylchlorosilane) thus obtained was hydrolyzed to p-phenylene-bis-(hydroxydimethylsilane) in cooled ethyl ether solution by treating it with a stoichiometric quantity of aqueous sodium hydroxide. Thus, 13.6 parts of p-phenylene-bis-(dimethylchlorosilane) dissolved in 140 parts of anhydrous ether was added over a period of 9 minutes to 69 parts of 1.5 normal aqeuous sodium hydroxide, the temperature of the latter being maintained at approximately 0° C. After thorough mixing, the ether solution was immediately separated, and the aqeuous layer was extracted with an additional 72 parts of ethyl ether. The combined ether layers were immediately dried with 20 parts of anhydrous potassium carbonate.

Isolation of the desired product was finally accomplished by concentration of the ethereal solution under vacuum until crystals began to appear. These were removed by filtration, and further quantities of product were isolated by addition of benzene to the mother liquor. A quantity of the p-phenylene-bis-(hydroxydimethylsilane) was thus obtained, which melted at 135° C.

Analytical data indicating the identity of this compound are:

|  | Calculated | Found |
|---|---|---|
| Si | 24.79 | 24.47 |
| C | 53.05 | 53.20 |
| H | 8.01 | 8.01 |
| O (By difference) | 14.14 | 14.32 |
| Mol. Wt. (in glacial acetic acid) | 226.4 | 222 |

A linear, orientable polymer, poly-p-phenylene-bis-(dimethylsiloxane), was prepared by dehydration polymerization of this p-phenylene-bis-(hydroxydimethylsilane) in the presence of 0.02% sodium hydroxide (on weight of monomer) in an atmosphere of pure nitrogen. Thus, two parts of the p-phenylene-bis-(hydroxydimethylsilane) was thoroughly wetted with two parts of a 0.02% aqueous solution of sodium hydroxide, and after removing the bulk of the added water by means of evaporation under vacuum, below 100° C., the resulting mixture was heated in an atmosphere of nitrogen to prevent undesirable oxidation. The temperature was gradually raised to 250° C.; a total heating time of 47.5 hours was used above 200° C. with 39 hours at 250° C.

The polymer made by the above procedure was oriented by melting it and drawing out filaments from the melt while cooling it to a solid and continuing drawing after solidification had occurred so that in the final drawing the polymer was drawn under strain. Individual filaments (monofils) of this drawn polymer showed definite orientation by characteristic X-ray diffraction patterns.

Properties of the cold-drawn, oriented polymer were as follows:

Melting point=125–127° C.
Tenacity at 16% elongation of fibre having drawn ratio of 4.9:1=1.7 grams/denier.
Modulus of elasticity of drawn monofil=100,000 p. s. i.
Recovery from bending=88%.
Work recovery over elongation range of ¾%=80%.
Shrinkage in boiling water=5%.
Effect of wetting out on tenacity or stiffness of monofil=no measurable effect.

Excellent products were also obtained using .005% potassium hydroxide and .04% and .02% lithium hydroxide (monohydrate) in place of the .02% sodium hydroxide as the catalyst in the polymerization step. Using 0.5% sodium hydroxide gave polymers having molecular weights of about 1345 which were brittle waxes and 0.2% sodium hydroxide gave polymers having molecular weights of about 8600 which were tough, waxy solids. In contrast the products made using 0.02% sodium hydroxide and which were orientable were calculated to have molecular weights of the order of 100,000 or more.

*Example II*

Products corresponding to those described in Example I except having phenyl groups as the monovalent organic groups attached to the silicon atoms in place of methyl groups are produced by the techniques of Example I, using diphenyldichlorosilane in place of dimethyldichlorosilane as the starting material. In the initial reaction, giving para phenylene bis (diphenylchlorosilane), a higher reaction temperature is used, the temperature being above 100° C.

I claim:

1. In a process for producing a polymer containing alternate oxygen atoms and phenylene radicals between consecutive silicon atoms in the polymer chain the step comprising polymerizing a compound having the formula

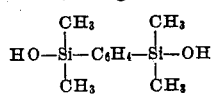

the $C_6H_4$=group being a para phenylene group, by heating it for about 50 hours above about 200° C. in the presence of about 0.02 per cent by weight of sodium hydroxide.

2. In a process for producing a polymer containing alternate oxygen atoms and phenylene radicals between consecutive silicon atoms in the polymer chain the steps comprising polymerizing a compound having the formula

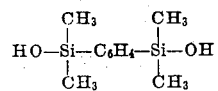

the $C_6H_4$-group being a para phenylene group, by heating it for about 50 hours above about 200° C. in the presence of about 0.02 per cent by weight of sodium hydroxide, forming the polymer into a fibre, and drawing the fibre under strain.

3. A linear condensation polymer containing a long chain of recurring units consisting of alternate siloxane groups and arylene radicals, the two valences of each silicon atom not joined in the polymer chain being satisfied by monovalent hydrocarbon radicals which are free of unsaturation other than aromatic unsaturation, the silicon atoms being situated para to each other on the arylene radical.

4. A linear condensation polymer containing a long chain of recurring units consisting of alternate siloxane groups and para phenylene radicals in the polymer chain, the two valences of each silicon atom not joined in the polymer chain being satisfied by monovalent hydrocarbon radicals which are free of unsaturation other than aromatic unsaturation.

5. A linear condensation polymer containing a long chain of recurring units consisting of alternate siloxane groups and para-phenylene radicals in the polymer chain, the two valences of each silicon atom not joined in the polymer chain being satisfied by methyl radicals.

6. In a process for producing linear condensation polymers, the step comprising subjecting a compound having the formula

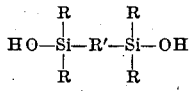

where R stands for a monovalent hydrocarbon radical which is free of unsaturation other than aromatic unsaturation and R' for an arylene radical, the silicon atoms being situated para to each other on the arylene radical, to condensation reaction conditions while heating at above about 200° C. in the presence of a catalytic amount of an alkali metal hydroxide.

7. A polymer containing a long chain of recurring units consisting of alternate siloxane groups and arylene radicals in the polymer chain, the two valences of each silicon atom not joined in the polymer chain being satisfied by monovalent hydrocarbon radicals which are free of unsaturation other than aromatic unsaturation, the silicon atoms being situated para to each other on the arylene radical.

8. A polymer containing a long chain of recurring units consisting of alternate siloxane groups and para-phenylene radicals in the polymer chain, the two valences of each silicon atom not joined in the polymer chain being satisfied by monovalent hydrocarbon groups which are free of unsaturation other than aromatic unsaturation, which polymer is oriented by having been drawn under strain.

9. In a process for producing an oriented polymer containing a long chain of recurring units consisting of alternate siloxane groups and divalent organic radicals in the polymer chain, the steps comprising polymerizing a compound having the formula

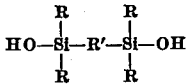

where R stands for a monovalent hydrocarbon which is free of unsaturation other than aromatic unsaturation and R' for a divalent arylene radical, the silicon atoms being situated para to each other on the arylene radical, by heating it in the presence of a condensation catalyst, forming the polymer into a fibre, and drawing the fibre under strain.

10. In a process for producing an oriented polymer containing a long chain of recurring units consisting of alternate siloxane groups and divalent organic radicals in the polymer chain, the steps comprising polymerizing a compound having the formula

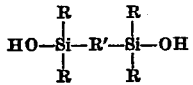

where R stands for a monovalent hydrocarbon radical which is free of unsaturation other than aromatic unsaturation and R' for a divalent arylene radical, the silicon atoms being situated para to each other on the arylene radical, by heating it above about 200° C. in the presence of a catalytic amount of an alkali metal hydroxide, forming the polymer into a fibre, and drawing the fiber under strain.

MICHAEL SVEDA.

REFERENCES CITED

The following references are of record in the file of this patent:

UNITED STATES PATENTS

| Number | Name | Date |
|---|---|---|
| 1,807,178 | Seil | May 26, 1931 |
| 2,381,366 | Patnode | Aug. 7, 1945 |
| 2,383,817 | Rochow | Aug. 28, 1945 |
| 2,386,793 | Hanford | Oct. 16, 1945 |
| 2,389,802 | McGregor et al. | Nov. 27, 1945 |
| 2,444,858 | Speier | July 6, 1948 |
| 2,452,895 | Bluestein | Nov. 2, 1948 |
| 2,486,162 | Hyde | Oct. 25, 1949 |

OTHER REFERENCES

Gold et al.: Journ. Amer. Chem. Soc., vol. 70, September 1948, pp. 2874–2876.

Bygdene et al.: Berichte Deut. Chem. Gesel, vol. 48, 1915, pp. 1236 to 1242.

Rochow: Chemistry of the Silicones, Wiley, 1946, page 55.

Meyer: Natural and Synthetic High Polymers, Interscience, 1942, pp. 62 to 66.

Kipping et al.: Journ Chem Soc., London, vol. 132, pp. 360–367, 1929.

Hurd et al.: Ind. & Eng. Chem., vol. 40, November 1948, pages 2078–2081.

Certificate of Correction

Patent No. 2,562,000                            July 24, 1951

MICHAEL SVEDA

It is hereby certified that error appears in the printed specification of the above numbered patent requiring correction as follows:

Column 3, line 66, for "$CnF_{(2n+1)}$" read $C_nF_{(2n+1)}$; column 8, line 19, for "$C_6H_4$=group" read $C_6H_4$—group; column 9, line 9, after "radical" strike out the period and insert instead , *which polymer is oriented by having been drawn under strain.*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*